(No Model.)
W. GLYNN.
MACHINE FOR CUTTING CANDY.
No. 303,429. Patented Aug. 12, 1884.
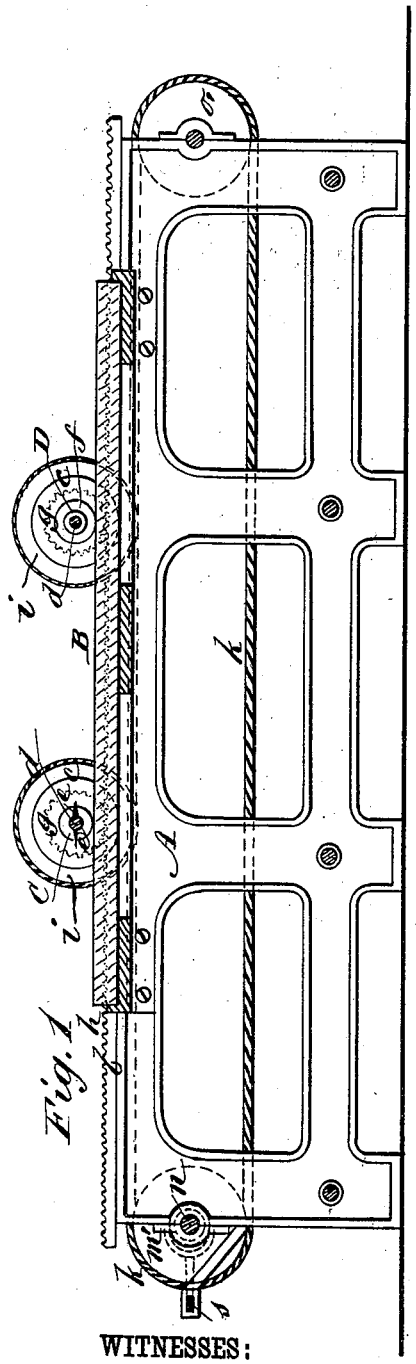
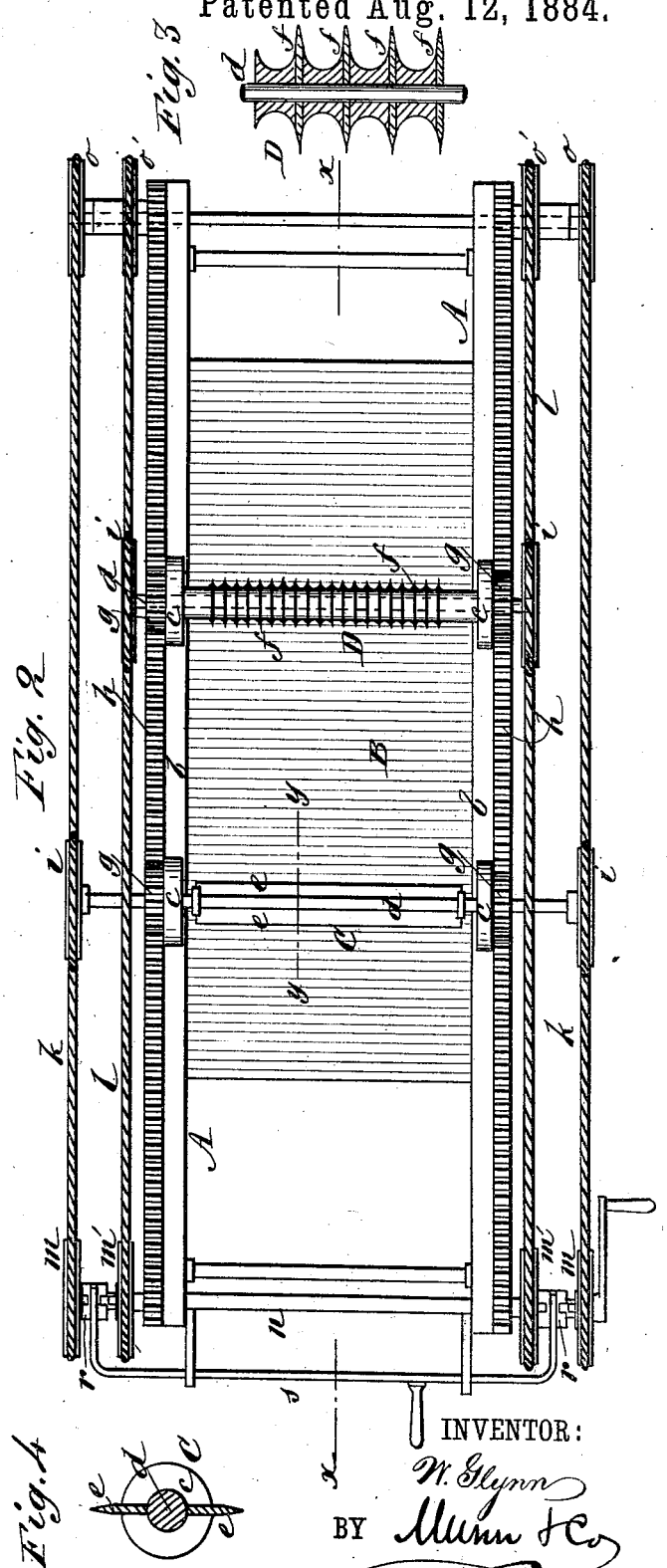
WITNESSES:
C. Neveux
C. Sedgwick
INVENTOR:
W. Glynn
BY Munn & Co
ATTORNEYS.

UNITED STATES PATENT OFFICE.

WILLIAM GLYNN, OF MONTPELIER, VERMONT.

MACHINE FOR CUTTING CANDY.

SPECIFICATION forming part of Letters Patent No. 303,429, dated August 12, 1884.

Application filed November 10, 1883. (No model.)

*To all whom it may concern:*

Be it known that I, WILLIAM GLYNN, of Montpelier, in the county of Washington and State of Vermont, have invented certain new and useful Improvements in Machines for Cutting Candy, of which the following is a full, clear, and exact description.

This invention has for its object the more speedy and perfect cutting of bar candy and the economizing of labor employed in such work; also the preventing of waste, or saving of stock, which is costly. Heretofore it has been customary, in making horehound and other bar candy, to pour the candy, when boiled, onto a large, flat, smooth slab of marble or other stone, onto which is temporarily mounted a border-frame to keep the melted candy from running off the sides and ends, said frame being removed when the candy is set or cold enough to be cut. Rotary cutters properly shaped are then run by hand over the batch of candy by a series of short separate movements to cut the batch into bars of the necessary length and width. This is not only a tedious and expensive operation, involving costly labor and requiring a repeated action of the cutters, but in commencing at one end of the batch, when it is comparatively very soft, the severed candy runs into the cuts, and it is difficult to run the cutters in the same courses again, while the opposite end of the batch, when reached, is so hard that it is often impossible to cut the candy deep enough to break. In this way much candy is bro' n and wasted, and a large portion of that which is not broken presents such ragged and irregular edges or surfaces that it is unfit for sale. With my invention all this is avoided. One boy turning a crank or handle will do the work of a man and a boy heretofore required in cutting up the batch into bars of the required length and width, and so soon as the batch is ready to cut it is promptly acted upon by the cutters while it is in proper condition for cutting over its whole surface, thus saving both time and waste of costly stock.

To these and other ends, the invention consists in a machine of novel construction for the purpose designated, and in which stands or sets of rotary cutters for severing the batch in directions of its length and breadth are supported by bearing-wheels arranged to run upon side tracks of a fixed frame, and are rotated and otherwise operated by pinions arranged to engage with fixed racks, motion being communicated by endless belts or chains, substantially as hereinafter described.

Reference is to be had to the accompanying drawings, forming a part of this specification, in which similar letters of reference indicate corresponding parts in all the figures.

Figure 1 is a vertical longitudinal section on the line $x\ x$ in Fig. 2 of a bar-candy-cutting machine embodying my invention; Fig. 2, a plan of the same; Fig. 3, a longitudinal section of a stand of rotary cutters for severing the batch in the one direction corresponding with the breadth of the bars of candy, and Fig. 4 a transverse section on the line $y\ y$ in Fig. 2 of a cutter for severing the batch in a reverse direction corresponding with the length of said bars.

A A are the side frames of the machine, united by cross-bars, and serving to carry the horizontal marble slab or stone B, on which, inclosed by a suitable frame or bars, the boiling or melted candy is poured. Upon and along the top of these side frames are parallel tracks $b\ b$, upon which bearing-wheels $c\ c$ of cross rotary combination-cutters C D travel. These cutters, or "stands of cutters," as they may be termed, are arranged parallel with each other, and one in advance of the other. Each consists of a shaft or bar, $d$, armed with proper cutting-blades, the one cutter, C, having its knives or blades $e$, which sever the batch of candy lengthwise of the bars, arranged radially to its shaft, and extending across the slab B, while the other cutter, D, which severs the batch in a breadthwise direction of the bars, is made up of a series of circular parallel knives, $f$, arranged at suitable distances apart transversely of the shaft of said cutter. The bearing-wheels $c\ c$ serve to gage the acting depth of the cutters, and to prevent them from cutting up the marble or slab B as the cutters are rotated and travel along over the batch of candy. Outside of these bearing-wheels $c\ c$, upon the same shafts $d\ d$, are pinions $g\ g$, which engage with longitudinal fixed racks $h\ h$ on the side frames, for the purpose of rotating the cutters and of moving them along the frame; and outside of these pinions again, upon the shafts $d\ d$, are pulleys $i\ i$, passing around which are endless bands $k\ k$ and $l\ l$, arranged to pass round driving-pulleys $m\ m'$ upon a shaft, $n$, at the one end of the machine, and carrying pulleys $o\ o'$ at the opposite end of the machine.

Upon the driving-shaft $n$, which may be rotated by a hand-crank or by steam-power, are sliding clutches $r\ r$, connected by a frame or bar, $s$, and serving, according to the direction in which they are slid, to engage with the driving-wheels $m$ or $m'$, accordingly as it is required to operate the cutter C or cutter D, by the bands $k$ and $l$, which connect, respectively, with the pulleys $i$ of either cutter, it not generally being necessary to operate both cutters at the same time.

From this description it will be seen that by turning the shaft $n$ in the right direction the cutters C and D will be successively run and rotated over the batch of candy on the slab B, to cut said batch into bars or pieces of the required length and breadth, the blades $e$ of the cutters C being properly shaped to leave the candy as the cogs of the pinions $g$ on said cutter's shaft leave or work free of the racks $h\ h$. The tracks $b\ b$ and racks $h\ h$ extend beyond the slab B, in order that the cutters C D may be run off said slab when it is required for working any other kind of candy, or when the cut candy is required to be removed and the slab B to be greased for a succeeding batch. The cutters, it will be seen, will always run in the same courses when running them repeatedly over the batch, and will leave a nice clean edge on every stick or bar of candy, also will prevent waste in breakage, as the cutters may be set close enough to the slab to almost cut the candy through in sticks or squares. The blades of the cutters may be made adjustable, to vary the sizes of the cut pieces.

Having thus described my invention, what I claim as new, and desire to secure by Letters Patent, is—

1. In a machine for cutting candy, the combination, with the slab upon which the candy is poured, of duplicate mechanically-driven rotary cutters arranged to travel lengthwise over the slab, and the one of which is armed with radial blades, while the other cutter is provided with a series of circular blades, substantially as and for the purposes herein set forth.

2. In a machine for cutting candy, the combination, with the slab B and the mechanically-driven rotary cutters C D, moving over the same, of the bearing-wheels $c\ c$ and the tracks $b\ b$, essentially as and for the purposes described.

3. In a machine for cutting candy, the combination, with the slab B and the mechanically-driven rotary cutters C D, traveling over the same, of the bearing-wheels $c\ c$, the tracks $b\ b$, the pinions $g\ g$, and the fixed racks $h\ h$, substantially as specified.

4. The combination of the pulleys $m\ m'$, $i\ i$, and $o\ o'$, the bands $k\ l$, the rotary longitudinally-traveling cutters C D, the bearing-wheels $c\ c$, the tracks $b\ b$, the pinions $g\ g$, the racks $h\ h$, and the slab B, essentially as described.

5. The combination, with the independent rotary and longitudinally traveling or rolling cutters C D and the slab B, of the independent driving-pulleys $m\ m'$, the clutch $r\ r$, the driving-shaft $n$, the bands $k\ l$, and the pulleys $i\ i$ and $o\ o'$, essentially as and for the purpose herein set forth.

WILLIAM GLYNN.

Witnesses:
J. C. HOUGHTON,
F. M. KENDALL.